United States Patent [19]

Helin

[11] 3,729,572

[45] Apr. 24, 1973

[54] SPLIT OUTLET PLATE

[76] Inventor: Charles J. Helin, 1488 San Pasqual St., Pasadena, Calif. 91106

[22] Filed: July 12, 1971

[21] Appl. No.: 161,744

Related U.S. Application Data

[63] Continuation-in-part of Ser. No. 44,183, June 8, 1970, abandoned.

[52] U.S. Cl. ............... 174/66, 220/3.6, 220/24.2
[51] Int. Cl. ............................................ H02g 3/14
[58] Field of Search ......................... 174/66, 67; 220/24.2, 24.3, 3.6; 248/27, DIG. 6

[56] References Cited

UNITED STATES PATENTS

| | | |
|---|---|---|
| 3,597,526 | 8/1971 | Boatwright .................. 174/66 |
| 2,761,112 | 8/1956 | Torcivia ..................... 174/67 X |
| 801,536 | 10/1905 | Marshall ..................... 220/24.2 |
| 2,374,993 | 5/1945 | Haynes ...................... 248/DIG. 6 |

*Primary Examiner*—Bernard A. Gilheany
*Assistant Examiner*—D. A. Tone
*Attorney*—Walter G. Maxwell et al.

[57] ABSTRACT

An outlet plate is split into an upper half and a lower half, with a hole through the center of the plate for easily fitting the plate around a cord extending out of an opening in a wall. The plate halves are held together in a common plane by a cooperating tongue and groove arrangement at the interface of the plate halves. The connected plate halves may be secured to the wall, although it is preferred to fasten them to a rigid reinforcing ring shaped to fit around the opening in the wall.

17 Claims, 8 Drawing Figures

Patented April 24, 1973
3,729,572
3 Sheets-Sheet 1
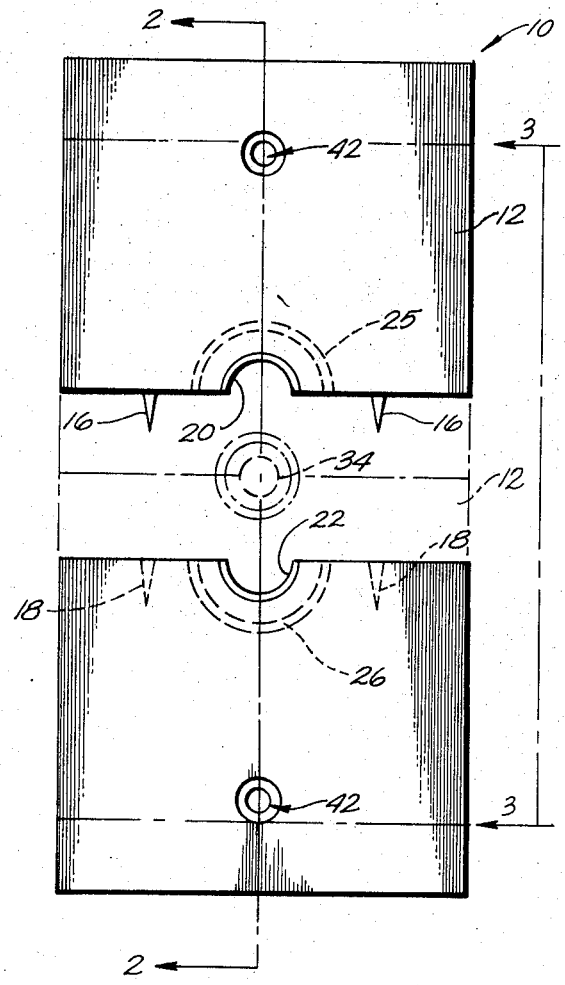
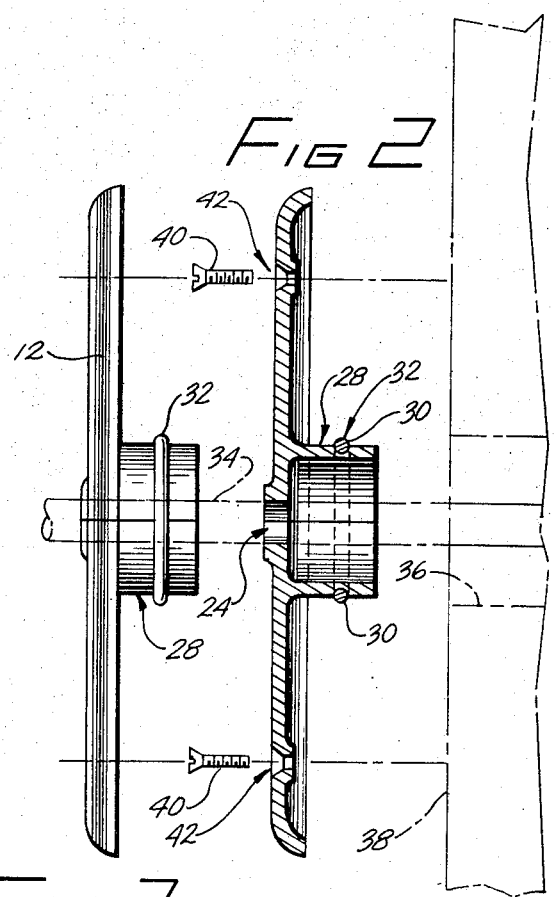
INVENTOR.
CHARLES J. HELIN
BY
Christie, Parker & Hale
ATTORNEYS Patented April 24, 1973 3,729,572

SPLIT OUTLET PLATE

CROSS-REFERENCE TO RELATED APPLICATION

This is a continuation-in-part of my application Ser. No. 44,183, filed June 8, 1970, now abandoned.

BACKGROUND OF THE INVENTION

This invention relates to a split outlet plate adapted to fit around a cord extending out of a wall.

When a cable such as a telephone cord is extended out from an opening in a wall, it is commonly drawn through a hole in the center of a flat outlet plate which is thereafter connected to the wall to cover the opening. The disadvantage of the conventional one-piece outlet plate is that when each end of the cord is connected to a fitting, a junction box, or the like, the cord cannot be threaded through the hole in the outlet plate unless the cord is first disconnected from one of the fittings. Another disadvantage of the one-piece outlet plate is that a cord which is already installed must be disconnected from one of its fittings if the outlet plate is added after the cord has been installed.

The conventional one-piece outlet plate frequently is secured directly to the wall with wood screws. In walls made of plasterboard or the like, the outlet plate becomes loose if it is removed and replaced several times.

SUMMARY OF THE INVENTION

Briefly, this invention provides an outlet plate adapted to be fitted around a cord extending out from an opening in a wall. The plate is split into a pair of plate halves which are releasably fastened together so they are held in a common plane. When the plate halves are held together, they form a hole through which the cord passes. Each plate half is adapted for connection to the wall to maintain the fastened plate halves in their fixed relation around the cord and against the wall. The split outlet plate is useful in situations where each end of a cord is connected to a fitting or the like. The split plate is disconnected from the wall, disassembled, fitted around the cord after passing one of the fittings, reassembled, and reconnected to the wall.

In one form of the invention, the plate halves are held together in a common plane by outwardly projecting tongues on one plate half adapted to make a snug friction fit in matching grooves in the other plate half. Thus, the plate halves are quickly and easily assembled or disassembled either by slipping the tongues into their matching grooves, or by pulling the plate halves apart, respectively.

Preferably, a base plate is fitted around the opening in the wall to provide a good structural base for mounting the split outlet plate to the wall. The base plate preferably is releasably clamped in the opening in the wall, and each plate half is releasably fastened to the base plate.

BRIEF DESCRIPTION OF THE DRAWINGS

These and other aspects of the invention are more fully set forth in the following detailed description of the embodiments of the invention which are presently preferred, the description being presented with reference to the accompanying drawings, in which:

FIG. 1 is an elevation showing the split outlet plate in its disassembled form;

FIG. 2 is a sectional elevation taken on line 2—2 of FIG. 1 showing the split outlet plate in its assembled form fitted around a cable;

FIG. 3 is an elevation taken on line 3—3 of FIG. 1;

DETAILED DESCRIPTION OF THE PREFERRED EMBODIMENT

Figure 4:
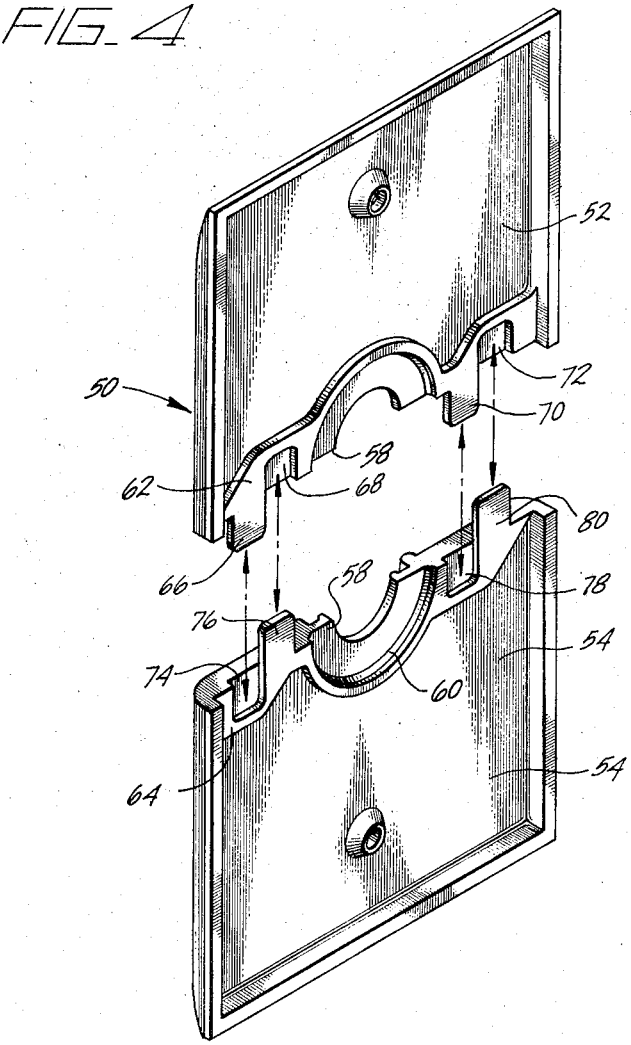
FIG. 4 is a perspective view showing an alternative form of the split outlet plate in a disassembled form.

Referring to the drawings, a split outlet plate 10 includes an upper plate half 12 and a lower plate half 14. The upper plate half has a pair of downwardly extending, conical alignment pins 16 adapted to fit into matching holes 18 in the upper part of the lower plate half 14. A downwardly opening recess 20 is formed in the lower marginal edge of upper plate half 12, and a cooperating upwardly opening recess 22 is formed in the upper marginal edge of lower plate half 14.

The plate halves are connected together by inserting pins 16 into their respective holes 18. When connected, the plate halves lie in a common plane, and recesses 20 and 22 cooperate to define a circular opening 24 in the center of the assembled plate. Means other than the alignment pins, such as a cooperating tongue and groove arrangement, also may be used to maintain the plate halves in a fixed relation so they form a flat plate.

An arcuate boss 25 formed integrally with the rear face of upper plate 12 borders recess 20, and a cooperating arcuate boss 26 formed integrally with the rear face of the lower plate half 14 borders recess 22. When upper and lower plate halves 12 and 14 are connected by alignment pins 16, the bosses form a rearwardly projecting annular cylindrical channel 28. A separate arcuate groove 30 may be formed in the outer surface of each boss, and the respective grooves cooperate to provide a circular groove that surrounds the channel 28 when the plate halves are connected. A generally C-shaped snap ring 32 snaps into the circular groove formed by the channel to clamp the plate halves together. The channel and the spring clamp combination also is an effective means for providing rigidity for the plate halves after they are assembled.

In use, the outlet plate 10 is easily fitted around a cable 34 extending out of an opening 36 in a wall, a junction box, or the like represented generally by the reference numeral 38. The separated plate halves fit around the cable and are connected by fitting alignment pins 16 into their respective holes 18 so the cable extends through the opening 24 formed by the assembled plate halves. Spring clamp 32 is then slipped around the channel 28 at the rear of the assembled plate. The channel is then fitted into the opening 36, and the assembled plate is fastened to the wall or junction box 38 by screws 40 extending through respective holes 42 in the upper and lower plate halves.

Thus, if the ends of cable 34 are connected to fittings, electrical devices, or the like which are too large to be threaded through the opening 24 in split outlet plate 10, the outlet plate is simply removed from the wall, and disassembled by removing clamp 32 and separating the plate halves to permit the cord and fitting to be drawn through the opening in the wall. The split outlet plate also is easily adapted for use in cases where the cord 34 is already installed and it is desired to add the outlet plate to the wall.

The split outlet plate is preferably constructed of molded plastic, but it also can be made from a die-cast metal. Clamp 32 is preferably constructed of spring steel, although other suitable resilient materials could also be used. Other forms of clamping devices also may be used in place of spring clamp 32, so long as they are capable of maintaining the bosses 25 and 26 in their fixed relation holding the plate halves together. For example, a conventional hose clamp or circular spring, tied at its ends, could be used in place of spring clamp 32. Furthermore, other fastening means such as a cooperating tongue and groove arrangement, could be used to connect bosses 25 and 26.

FIGS. 4 through 7 show an alternate split outlet plate 50 which is similar to outlet plate 10, except that bosses 25 and 26 and snap ring 32 are eliminated and different means are provided for holding the plate halves together. Split outlet plate 50 includes an upper plate half 52 and a lower plate half 54. As shown best in FIG. 6, the upper and lower plate halves are fastened together in a tight friction fit so that the two plate halves are held in a common plane. A circular opening 56 is formed in the center of the assembled outlet plate. Opening 56 is centered in a ring-shaped breakaway section 58 having an outer periphery defined by a relatively thin wall 59 which is integral with a circular forwardly and rearwardly extending raised boss 60 centered in the assembled outlet plate. Each semi-circular portion of breakaway section 58 may be removed from its respective plate half by applying pressure to the semi-circular portions to sever circular wall 59 from boss 60.

Opening 58 is a relatively small hole which is sufficient in size to accommodate a conventional telephone cord. The split outlet plate also is capable of accommodating telephone cords having larger diameters. A typical large-diameter telephone cord is the standard multi-conductor communication cable which carries wires for connection to a telephone having a control panel with several pushbuttons. In this instance, breakaway section 58 is severed from the plate halves to provide a large central opening (not shown) within boss 60.

Means for connecting plate halves 52 and 54 are shown best in FIG. 4. The rear side of upper plate half 52 has a raised portion 62 at its bottom, and lower plate half 54 has an identical raised portion 64 at its top. Raised portion 62 includes both a downwardly projecting, substantially U-shaped shoulder 66, and an adjacent downwardly opening, substantially U-shaped groove 68 on one side of central opening 56 (see FIGS. 5 and 7). On the other side of opening 56, raised portion 62 includes a second downwardly projecting shoulder 70 identical to shoulder 66 and an adjacent groove 72 identical to groove 68. Raised portion 64 includes both an upwardly opening, substantially U-shaped groove 74 and an adjacent upwardly projecting, substantially U-shaped tongue 76 on one side of opening 56. On the other side of opening 56, raised portion 64 includes an upwardly opening groove 78 identical to groove 74, and an adjacent tongue 80 identical to tongue 76.

Preferably, the outlet plate is made of injection molded plastic to facilitate easy and relatively inexpensive fabrication of the tongue and groove arrangement. The particular design of plate halves 52 and 54 is especially useful in reducing fabrication costs, because each plate half is identical and therefore may be made from the same mold.

The tongue and groove arrangement on plate halves 52 and 54 is configured so that tongues 66 and 70 slide into grooves 74 and 78, with tongues 76 and 80 being adapted to slide simultaneously into grooves 68 and 72. The cooperating tongue and groove arrangement is configured so that each tongue makes a tight friction fit in its corresponding groove. Thus, when the plate halves are slipped together they are held tightly in a common plane.

In use, plate halves 52 and 54 are fitted around a cable 82 (see FIGS. 5 and 6) by initially aligning the plate halves as shown in FIG. 4, and thereafter pushing the plate halves together to frictionally engage the cooperating tongues and grooves at the interface of the plate halves. The resulting assembled split outlet plate is shown best in FIG. 7.

The cooperating tongue and groove arrangement not only provides a good friction hold at the interface of the plate halves, but it also provides good structural resistance to bending of the plate halves by forces applied against the front surface of either plate half. The assembled split outlet plate 50 has been evaluated in a pull test in which an identical bending force is applied against the face of each plate half. With a pull force of 50 pounds, the plate halves deflected approximately one-eighth of an inch, and returned to their original position when the pull force was removed. The split outlet plate 10 shown in FIGS. 1 through 3 also was subjected to the same bending test, and the plates deflected approximately the same amount. Thus, the split outlet plate of this invention has significant strength, with or without rear channel 28. Moreover, split outlet plate 50 has the following advantages over the outlet plate with the rear channel extension 28:

1. Increased usable space for telephone connectors behind the plate;

2. Increased flexibility for cable bend radii, especially in narrow wall space installations; and 3. Capability of removing only one plate half to gain access to the area behind the plate.

Figure 5:
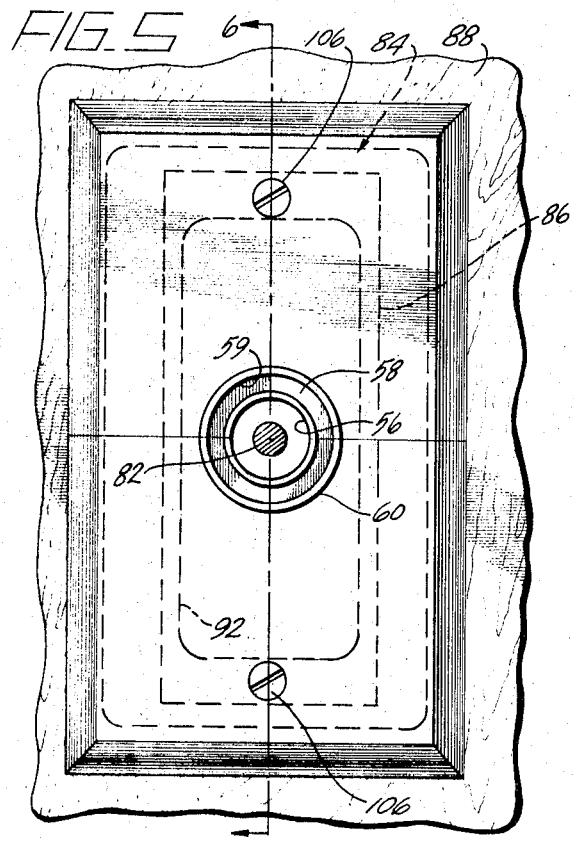
FIG. 5 is an elevation showing the split outlet plate of FIG. 4 in an assembled form mounted on a reinforcing ring secured to a wall.
Figure 7:
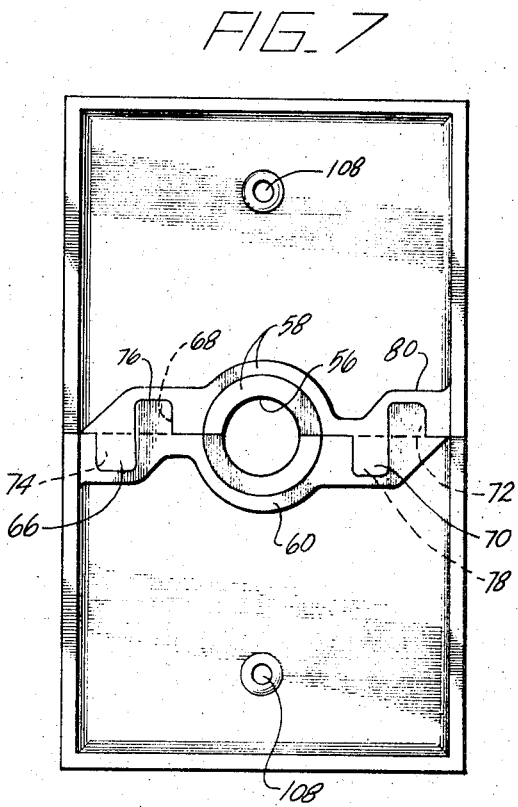
FIG. 7 is an elevation taken on line 7—7 of FIG. 6.
Figure 6:
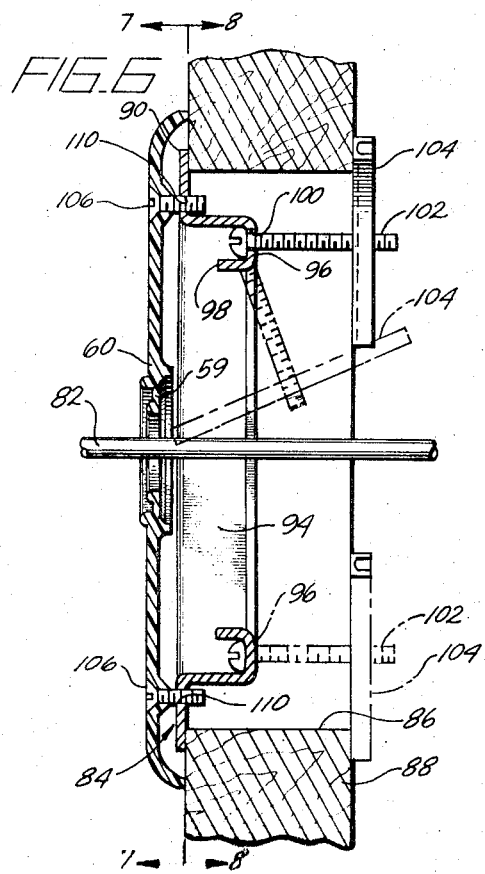
FIG. 6 is a sectional elevation taken on line 6—6 of FIG. 5.
Figure 8:
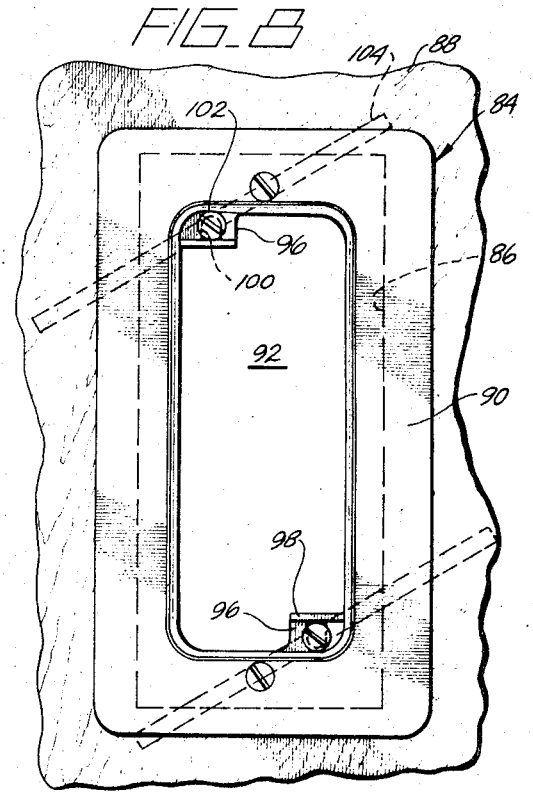
FIG. 8 is an elevation taken on line 8—8 of FIG. 6.

It is common for the telephone company to mount outlet plates directly to the wall with wood screws or the like. If the plate is mounted to walls made of plasterboard, it can become loose after being removed and replaced only a few times. FIGS. 5, 6, and 8 show a mounting plate 84 adapted to be fitted around an opening 86 in a wall 88 to provide a good structural base for the split outlet plate. Mounting plate 84 comprises a substantially rectangular and flat facing 90 with a large rectangular opening 92 in its center, the opening being bordered by a rearwardly projecting rectangular extension 94 having relatively thin walls bent at right-angles to the plane of facing 90. A pair of diagonally opposed shoulders 96 are formed integrally with the inner edge of extension 94 and bent downwardly to project into opening 92 and lie in a plane which is parallel to facing 90. As shown best in FIG. 6, the remote end of each shoulder is bent forwardly at a right-angle to form a lip 98 lying in a plane parallel to the top and bottom of rear extension 94.

An opening 100 formed in each shoulder is adapted to carry a respective screw 102. A separate elongated, channel-shaped clamping bar 104 is threaded onto each screw. Opening 100 extends through the vertical face of each shoulder and through the horizontal lip 98 of each shoulder. This permits each screw 102 to rotate from the substantially horizontal position shown in FIG. 6 to a substantially upright position, as represented by the phantom lines in FIG. 6.

In use, facing 90 of mounting plate 84 is placed against the face of wall 88, with rear extension 94 extending rearwardly into wall opening 86. Opening 92 in the mounting plate permits passage of cable 82, and is large enough to pass the conventional "Amphenol" plug connector for telephone cords. Each screw 102 and clamping bar 104 may be pivoted inwardly toward opening 92 to provide clearance for extension 94 as it fits into the opening in the wall. Screws 102 are captive in their respective shoulders 96 so that they do not become dislodged from the mounting plate and fall into the open area behind the wall. The mounting plate is then releasably secured to the wall by positioning screws 102 in their substantially horizontal position, shown in FIG. 6, and tightening clamping bars 104 against the reverse side of the wall, as shown best in FIG. 6. Preferably, each clamping bar is tightened to a diagonal position across the corners of wall opening 86 (see FIG. 8) to provide the maximum area of frictional contact between the reverse surface of the wall and the clamping bars, and maximum clearance for the passage of a connector.

After the mounting plate 84 is in position in the opening in the wall, the split outlet plate halves are fitted around cord 82 and slipped together, with the assembled split outlet plate being placed against facing 90 of the mounting plate. The split outlet plate is then rigidly secured to the facing of the mounting plate by a pair of screws 106 fitted through respective openings 108 in the plate halves and threaded through matching openings 110 in facing 90 of the mounting plate.

Preferably, the mounting plate 84 is made of metal, such as zinc-plated steel, although it can be made of plastic. Thus, the mounting plate provides a rigid reinforcement for the opening in the wall, which permits the split outlet plate to be removed and replaced as many times as desired without coming loose from the wall.

The features of the split outlet plate have been described in the context of a presently preferred embodiment, and it is understood that other variations and modifications of the invention could be made without departing from the scope of the invention. For example, the plate could be split vertically to provide left and right plate halves. Instead of being separated, the plate halves could be connected to pivot about a common corner so they pivot apart when fitted around a cable. Moreover, the hole 24 in the assembled plate and the surrounding channel can take other forms besides the circular one described above, and the hole need not be in the center of the assembled outlet plate. The alignment pins 16 can also take other forms, such as an elongated ridge on one plate half adapted to fit into a matching slot in the other plate half.

I claim:

1. For use with a cord extending out from an opening in a wall, an outlet plate adapted to be fitted around the cord including two plate halves; connecting means on each plate half engageable with each other for releasably fastening the plate halves together so they are maintained in a fixed relation in the same plane, the plate halves including means for fitting around the cord when the plate halves are separated so as to form a hole through which the cord passes when the plate halves are fastened together, each plate half including means for connection with the wall when the plate halves are fastened so that the plate halves are maintained in their fixed relation around the cord and against the wall.

2. Apparatus according to claim 1 wherein the connecting means includes a respective rearwardly extending boss formed integrally with the rear face of each plate, each boss having surface portions arranged for cooperation with the other boss when the plate halves are fastened to form a rearwardly projecting outlet channel surrounding the hole and extending into the opening in the wall, and means for maintaining each boss in a fixed relation relative to the other boss.

3. Apparatus according to claim 2 wherein the means for maintaining each boss in a fixed relation relative to the other boss comprises a spring biased clamp fitted around the outlet channel.

4. Apparatus according to claim 1 wherein the connecting means includes alignment pins on one plate half adapted to fit into matching holes on the other plate half.

5. Apparatus according to claim 1 wherein the connecting means comprise outwardly extending tongues on one plate half adapted to slidably engage matching grooves on the other plate half in a snug fit.

6. An outlet plate adapted to fit around a cord extending out from an opening in a wall, the outlet plate including two plate halves; outwardly projecting tongues formed on each plate half, each tongue being adapted to make a sliding releasable fit in a respective matching groove in the other plate half so the plate halves are releasably held together in a substantially planar relation, the plate halves including means fitting around the cord when the plate halves are separated so as to form a hole through which the cord passes when the plate halves are held together by the cooperating tongue and groove arrangement; and means on each plate half for connecting the plate halves to the wall when they are held together so that the cooperating plate halves are maintained in their fixed planar relation around the cord and against the wall.

7. Apparatus for shielding a cord extending out from an opening in a wall, the apparatus comprising a base plate shaped to fit around the opening in the wall; means for securing the base plate to the wall; two plate halves; means for releasably fastening the plate halves together so they are maintained in a fixed relation in the same plane, the plate halves including means for fitting around the cord when the plate halves are separated so as to form a hole through which the cord passes when the plate halves are fastened; and means for releasably connecting each plate half to the base plate when the plate halves are fastened so that the plate halves are maintained in their fixed relation around the cord and against the base plate.

8. Apparatus according to claim 7 in which the wall opening extends between a front surface of the wall and a reverse surface of the wall; and in which the base plate comprises a reinforcing ring shaped to fit in the wall opening to serve as a reinforcement channel which spans the perimeter of the wall opening, and a flat facing plate integral with the reinforcing ring and adapted to lie against the portion of the wall front surface surrounding the wall opening, and in which the reinforcing ring carries means for clamping against the reverse surface of the wall to hold the reinforcing ring in place around the opening.

9. An outlet plate adapted to fit around a cord extending out from an opening in a wall including two plate halves; means for aligning the plate halves so they are releasably held together in a substantially planar relation, the plate halves including means fitting around the cord when the plate halves are separated so as to form a hole through which the cord passes when the plate halves are held by the alignment means; a respective rearwardly extending boss formed integrally with the rear face of each plate, each boss including surface portions arranged for cooperation with the other boss when the plate halves are held by the alignment means to form a rearwardly projecting outlet channel surrounding the hole and adapted to extend into the opening in the wall; and means for releasably securing the bosses together so as to maintain the plate halves in their planar relation, each plate half including means for connection to the wall when the plate halves are held in their planar relation so that the plate halves are maintained around the cord and against the wall.

10. Apparatus according to claim 9 wherein the means for releasably securing the bosses together comprises a spring biased clamp fitted around the outlet channel.

11. Apparatus according to claim 9 wherein the alignment means comprises alignment pins on one plate half and matching holes in the other plate half.

12. Apparatus for reinforcing a wall opening extending between a front surface of a wall and a reverse surface of the wall, the apparatus comprising a reinforcing ring which includes a flat face plate having an opening extending therethrough, the face plate being shaped to lie against the front surface of the wall so it surrounds the opening in the wall, and an annular rim integral with the portion of the face plate which surrounds the opening therein, the rim being shaped to extend away from the face plate to form a reinforcing channel adapted to span the perimeter of the wall opening; a pair of elongated mounting members; spaced apart means on the reinforcing ring for carrying each mounting member so the mounting members can be held in a fixed relation with respect to the reinforcing ring and can extend through the wall opening and toward the reverse surface of the wall; and a separate elongated clamping bar adapted for attachment to each mounting member, each clamping bar being adjustable in position relative to its respective mounting member to be tightened against spaced apart portions of the wall reverse surface to hold the reinforcing ring in place in the wall opening.

13. Apparatus according to claim 12 including means for pivotally securing the mounting members to the reinforcing ring so that each mounting member can be swung to a position which provides clearance between it and the wall opening.

14. Apparatus according to claim 12 in which each mounting member comprises an externally threaded fastening member, and in which each clamping bar is threaded onto a respective one of the fastening members.

15. Apparatus according to claim 14 in which each fastening member is carried by a respective portion of the annular rim.

16. Apparatus according to claim 15 including means for pivotally securing each fastening member to said portion of the annular rim so that each mounting member can be swung to a position which provides clearance between it and the wall opening.

17. Apparatus according to claim 12 including separate openings extending through the face plate, whereby an outlet plate or the like can be secured to the reinforcing ring with fastening means extending through the openings in the face plate.

* * * * *